June 11, 1957 V. SANTARELLI 2,795,078
GARDEN DUSTER
Filed April 19, 1955
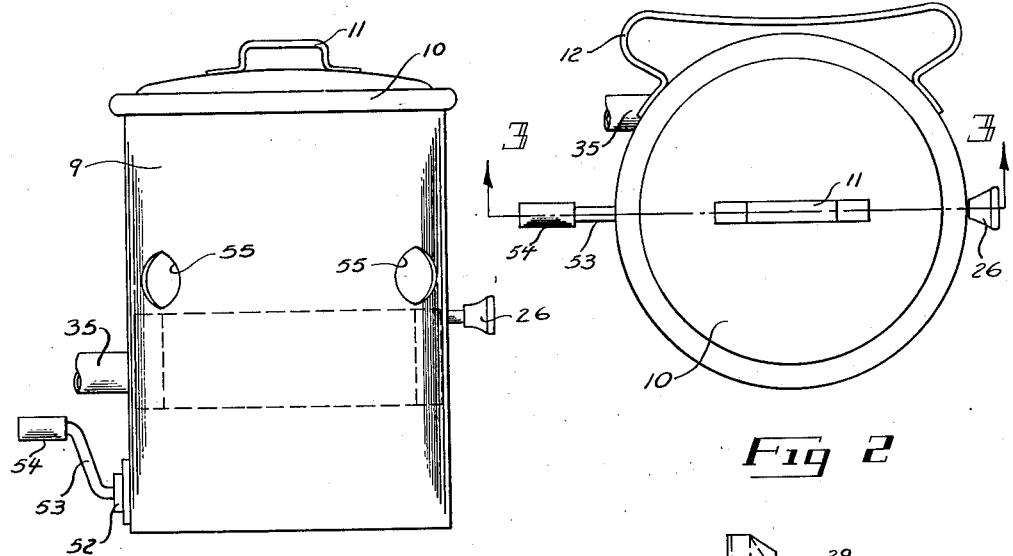
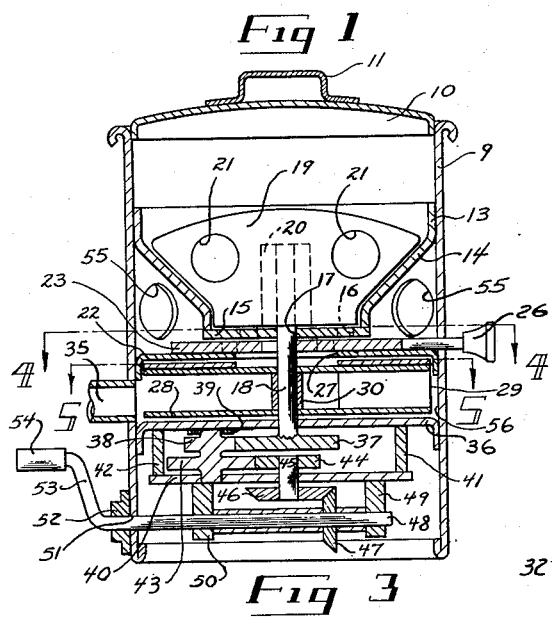
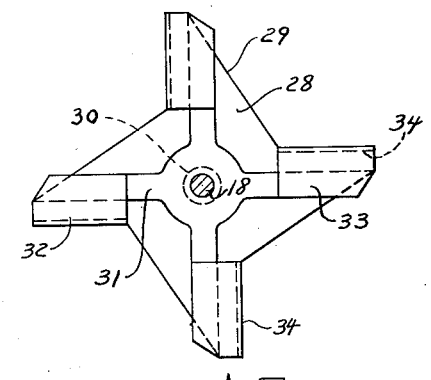
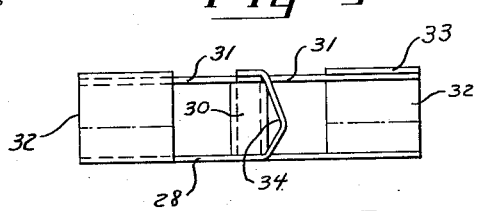
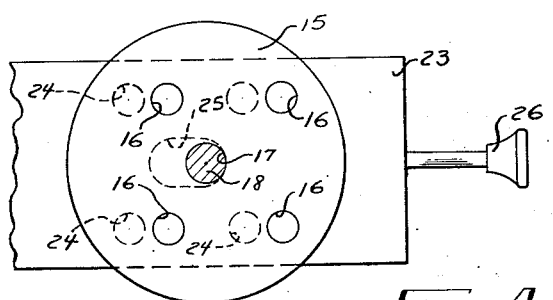
INVENTOR.
VINCENT SANTARELLI
BY

United States Patent Office 2,795,078
Patented June 11, 1957

2,795,078

GARDEN DUSTER

Vincent Santarelli, Detroit, Mich.

Application April 19, 1955, Serial No. 502,414

3 Claims. (Cl. 43—145)

This invention relates to an improved portable garden duster of the type adapted for dispersing insecticide in the form of dust onto plants, and the like.

It is an important object of this invention to provide a portable garden duster comprising, a container having a storage compartment for insecticide in the form of dust, a means for mixing and agitating said insecticide, a flow control means for controlling the amount of insecticide flowing from said storage compartment, an impeller for propelling the insecticide flowing from said container into a discharge pipe for deposition onto plants and the like, and an improved gear drive means for driving said impeller and agitator.

It is another object of this invention to provide a portable garden duster having a storage compartment for holding an insecticide in the form of dust, and means for agitating and expelling the dust from said storage compartment, which means are driven by a single drive unit which is actuable by a manually rotatable drive shaft.

It is a further object of this invention to provide a garden duster having a means for regulating the flow of insecticide from said duster which comprises a first stationary perforated plate for supporting the insecticide dust and a second perforated plate slidably mounted beneath said first perforated plate whereby the perforations in said second plate may be adjusted to register with the perforations in said first plate to control the outward flow of the insecticide, as desired.

It is a still further object of this invention to provide a novel garden duster including an improved gear type drive means for simultaneously driving an agitator and an impeller in said duster.

It is another object of this invention to provide a portable garden duster which is compact and rugged in construction, economical of manufacture, and efficient in use.

Other objects will appear hereinafter.

It is recognized that various modifications and changes may be made in the details of the structure illustrated without departing from the invention and it is intended that the present disclosure shall be considered to be but the preferred embodiment.

Forming a part of this application is a drawing, in which:

Fig. 1 is an elevational view of a preferred embodiment of the invention;

Fig. 2 is a top plan view of the structure illustrated in Fig. 1;

Fig. 3 is an elevational sectional view of the structure illustrated in Fig. 2, taken along the line 3—3 thereof;

Fig. 4 is a fragmentary horizontal view of the structure illustrated in Fig. 3, taken along the line 4—4 thereof;

Fig. 5 is a top plan view of the impeller employed in the invention, as viewed in Fig. 3, along the line 5—5 thereof, and looking in the direction of the arrows; and Fig. 6 is a side elevational view of the impeller shown in Fig. 5, taken in the direction of the arrow 6.

In the drawing, a preferred embodiment is shown, which comprises a cylindrical container 9 which is provided with a suitable cover 10, having a handle 11. As shown in Fig. 2, a handle 12 is fixedly mounted on the side of the container 9 to provide a means for carrying the duster.

As shown in Fig. 3, a storage compartment for insecticide, in the form of dust, is provided in the upper end of the container, by means of the vertically disposed circular partition 13, which is fixedly secured to the inner surface of the walls of the container 9. Integral with the partition 13 is a downwardly and inwardly sloping partition 14 which is substantially funnel-shaped, and which carries on the lower end thereof a stationary perforated plate 15, which is provided with a plurality of apertures or perforations therethrough, as at 16. The perforated plate 15 is provided with a centrally located aperture 17 in which is rotatably mounted a vertical drive shaft 18 for driving a plate-like, vertically disposed agitator 19. A connection means 20 is provided for fixing the agitator 19 on the upper end of the shaft 18. The agitator 19 is provided with holes therethrough, as at 21.

A horizontally disposed transverse supporting bracket 22 is fixedly mounted in the container 9 below the perforated plate 15. A second perforated plate is slidably mounted on the supporting bracket 22, at a point immediately below the perforated plate 15. The slidable perforated plate 23 is provided with a plurality of perforations therethrough, as at 24, and said plate is further provided with an elongated slot 25 through which the vertical drive shaft 18 passes. The slidable perforated plate 23 is provided with a handle 26 by means of which said plate may be adjusted inwardly and outwardly relative to said stationary perforated plate 15 whereby the perforations 16 and 24 may be brought into registration with each other and the outward flow of the insecticide from the storage compartment may be manually and accurately controlled, as desired.

The supporting bracket 22 is provided with a central opening 27 through which the insecticide is permitted to pass, and thereby fall on the plate 28 of the impeller generally indicated by the numeral 29. As shown in Fig. 3, the impeller 29 is operatively mounted in a discharge compartment 56 which is disposed below the storage compartment and which is enclosed on the upper end by the bracket 22 and on the lower end by the bracket 36. As best seen in Figs. 5 and 6, the impeller 29 comprises the lower plate 28, on which is mounted an upwardly extending hub 30 adapted to be fixedly secured to the drive shaft 18, by any suitable means. Fixedly mounted on the top of the impeller hub 30 is a plurality of outwardly extending arms 31 which are disposed in substantially perpendicular directions from each other. A plurality of substantially U-shaped impeller blades 32 are provided which are formed by means of a portion of the plate 28 being folded upwardly and over the arms 31 and into a fixed engagement therewith, as indicated by the numeral 33. The bight portion of the U-shaped impeller blades 32 is generally indicated by the numeral 34. It will be obvious that as the drive shaft 18 revolves the impeller 29, any insecticide dust which has fallen on the impeller plate 28 will be thrown or impelled outwardly by centrifugal force and then the dust will be caught by the blades 32 and propelled out of the container through the discharge pipe 35. A suitable discharge nozzle (not shown) may be attached to the discharge pipe or conduit 35.

Fixedly mounted below the impeller, on the inner side of the walls of the container 9, by any suitable means, is a transverse air-tight supporting bracket 36 through the center of which is rotatably mounted the drive shaft 18. As shown in Fig. 3, a drive gear 37 is fixedly mounted on the lower end of the drive shaft 18, which meshably engages a drive pinion gear 38, of a stepped gear unit. The stepped gear unit is fixedly mounted on a vertical shaft, the upper end of which is journalled in a bearing 39 that is fixed to the lower side of the bracket 36, and the lower end of which is journalled in a transverse plate 40 which is carried by two downwardly extending arms 41 and 42 affixed to the lower side of the bracket 36. A drive gear 43, on the stepped gear unit, drives the pinion gear 44 which is fixedly mounted on the upper end of a vertically disposed stub shaft 45. The stub shaft 45 is rotatably mounted in the transverse plate 40, and fixedly mounted on the lower end thereof is a beveled gear 46 which is meshably engaged with a second beveled gear 47 which is fixedly mounted on the horizontally disposed drive shaft 48.

The drive shaft 48 is rotatably mounted in a pair of vertically disposed arms 49 and 50, which are fixedly mounted on the lower side of the transverse plate 40. The drive shaft 48 extends outwardly through an aperture 51 in the wall of the container 9, and through a bearing block 52 on the outer side of the container. The outer end of the drive shaft 48 is integral with a drive crank 53 which is provided with a rotatable handle 54. As shown in Figs. 1 and 3, the container is provided with a plurality of apertures therethrough as 55, to permit the impeller 29 to draw in air to be mixed with the insecticide dust for dispersion outwardly through the discharge pipe 35.

In the use of the invention, the container storage compartment would be filled with a suitable insecticide in the form of dust and the cover 10 would be mounted in place. The adjustable plate handle 26, which is normally in an inwardly disposed position, as shown in Fig. 3, would then be pulled outwardly to align the perforations 16 and 24, and permit the insecticide dust to drop down into the impeller compartment in a desired amount or volume. The discharge nozzle (not shown) would then be directed toward the objects to be dusted, and the operator would then grasp the crank handle 54 and turn the crank in a clock-wise direction, when looking at the container from the left side of the structure of Fig. 3.

It will be seen that the rotation of the crank 53 in a clock-wise direction will rotate the drive shaft 48, and the above-described set of gears, in a direction so as to rotate the impeller 29 clock-wise, as viewed from the top of the duster. The clock-wise rotation of the impeller 29 will effectively and efficiently propel the insecticide dust which falls from the insecticide storage chamber outwardly through the discharge pipe 35, in an effective and efficient manner. When the dusting operation is finished, the operator will stop turning the crank 53 and move the flow control lever 26 inwardly to stop the flow of insecticide dust into the impeller chamber. It will be obvious that during the dusting operation, the drive shaft 18 turns the agitator 19 at the same rate of speed as the impeller 29, to provide a thorough mixing of the insecticide and insure a steady flow of the insecticide downwardly to the perforated flow control plate 15.

What I claim is:

1. A portable dusting device of the class described, comprising: a storage compartment for holding a quantity of insecticide dust; a discharge compartment disposed below said storage compartment; a flow control means for feeding the dust at a controlled rate from said storage compartment into said discharge compartment; an agitator operatively mounted in said storage compartment for mixing the insecticide dust; an impeller operatively mounted in said discharge compartment; a discharge outlet communicating with said discharge compartment through which said impeller may discharge the insecticide dust; a drive means connected to said agitator and said impeller for unitary drive thereof; a first gear fixed to said drive means; a rotatable stepped gear unit having a pinion thereon meshably engaging said first gear and a second gear mounted coaxially with said pinion; a stub shaft rotatably mounted on said device; a second pinion fixed on said stub shaft meshably engaging said second gear on said stepped gear unit; a first beveled gear on said stub shaft; a drive shaft rotatably mounted in said device; a second beveled gear on said drive shaft and meshably engaging said first beveled gear; and a crank on said drive shaft for manual rotation thereof, whereby said agitator and impeller may be driven by said gears and drive means.

2. A portable dusting device of the class described, comprising: a storage compartment for holding a quantity of insecticide dust; a discharge compartment disposed below said storage compartment; the bottom of said storage compartment being provided with a plurality of apertures therethrough; a plate slidably mounted between said compartments in a transverse position and engageable with the bottom of said storage compartment; said plate being provided with a plurality of apertures therethrough which will register with the apertures in the bottom of said storage compartment when the plate is moved to one position to connect said compartments, and which will not register when the plate is moved to another position; a rotatable vertical drive shaft centrally mounted in said device and passing through said compartments; an agitator in said storage compartment for mixing the insecticide dust and being fixed to said drive shaft; an impeller disposed in said discharge compartment and being fixed to said drive shaft; a discharge outlet communicating with said discharge compartment through which said impeller may discharge the insecticide dust; a first gear fixed on said drive shaft; a rotatable stepped gear unit having a pinion thereon meshably engaging said first gear and a second gear mounted coaxially with said pinion; a stub shaft rotatably mounted on said device; a second pinion fixed on said stub shaft meshably engaging said second gear on said stepped gear unit; a first beveled gear fixed on said stub shaft; a horizontal drive shaft rotatably mounted in said device; a second beveled gear fixed on said horizontal drive shaft and meshably engaging said first beveled gear; and a crank on said horizontal drive shaft for manual rotation thereof, whereby said agitator and impeller may be driven by said gears and thereby drive the vertical drive shaft.

3. A portable dusting device of the class described, comprising: a storage compartment for holding a quantity of insecticide dust; the lower part of said storage compartment tapering downwardly and inwardly, and terminating in a bottom part which is provided with a plurality of perforations therethrough; a discharge compartment disposed below said storage compartment; a plate slidably mounted between said compartments in a transverse position and engageable with the bottom of said storage compartment; said plate being provided with a plurality of perforations therethrough which will register with the perforations in the bottom of said storage compartment when the plate is moved to one position to connect said compartments, and which will not register when the plate is moved to another position; a rotatable vertical drive shaft centrally mounted in said device and passing through said compartments; an agitator in said storage compartment for mixing the insecticide dust and being fixed to said drive shaft; an impeller disposed in said discharge compartment and being fixed to said drive shaft; a discharge outlet communicating with said discharge compartment through which said impeller may discharge the insecticide dust; a first gear fixed on said drive shaft; a rotatable stepped gear unit having a pinion thereon meshably engaging said first gear and a second gear mounted coaxially with said pinion; a stub shaft rotatably mounted on said device; a second pinion fixed on said stub shaft meshably engaging said second gear on said stepped gear unit; a first beveled gear fixed on said stub shaft; a horizontal drive shaft rotatably mounted in said device; a second beveled gear fixed on said horizontal drive shaft and meshably engaging said first beveled gear; and a crank on said horizontal drive shaft for manual rotation thereof, whereby said agitator and impeller may be driven by said gears and horizontal drive shaft.

References Cited in the file of this patent

UNITED STATES PATENTS

| | | |
|---|---|---|
| 421,942 | Leggett | Feb. 25, 1890 |
| 423,814 | Richards | Mar. 18, 1890 |
| 2,668,060 | Tygart | Feb. 2, 1954 |

FOREIGN PATENTS

| | | |
|---|---|---|
| 58,902 | France | Dec. 2, 1953 |
| | (First addition to No. 934,683) | |